United States Patent
Takahashi et al.

(10) Patent No.: US 8,512,884 B2
(45) Date of Patent: Aug. 20, 2013

(54) PERPENDICULAR MAGNETIC RECORDING MEDIUM, METHOD FOR PRODUCING THE SAME, AND MAGNETIC RECORDING/REPRODUCING DEVICE

(75) Inventors: Migaku Takahashi, Sendai (JP); Shin Saito, Sendai (JP); Gohei Kurokawa, Ichihara (JP); Yuzo Sasaki, Ichihara (JP); Tatsu Komatsuda, Ichihara (JP); Atsushi Hashimoto, Chiba (JP); Akihiko Takeo, Minato-ku (JP); Tomoyuki Maeda, Kawasaki (JP)

(73) Assignees: Showa Denko K.K., Tokyo (JP); Kabushiki Kaisha Toshiba, Tokyo (JP); Tohoku University, Miyagi (JP)

( * ) Notice: Subject to any disclaimer, the term of this patent is extended or adjusted under 35 U.S.C. 154(b) by 405 days.

(21) Appl. No.: 12/675,090

(22) PCT Filed: Aug. 28, 2008

(86) PCT No.: PCT/JP2008/065438
§ 371 (c)(1),
(2), (4) Date: Feb. 24, 2010

(87) PCT Pub. No.: WO2009/028621
PCT Pub. Date: Mar. 5, 2009

(65) Prior Publication Data
US 2011/0151280 A1    Jun. 23, 2011

(30) Foreign Application Priority Data
Aug. 31, 2007    (JP) .................................. 2007-226648

(51) Int. Cl.
*G11B 5/66*    (2006.01)
(52) U.S. Cl.
USPC .................................. 428/831.2; 204/192.15

(58) Field of Classification Search
None
See application file for complete search history.

(56) References Cited

U.S. PATENT DOCUMENTS

2002/0048693 A1*  4/2002  Tanahashi et al. ...... 428/694 TS
2002/0164501 A1*  11/2002  Hikosaka .................. 428/694 T
(Continued)

FOREIGN PATENT DOCUMENTS

JP    2001-006158 A    1/2001
JP    2002-197630 A    7/2002
(Continued)

OTHER PUBLICATIONS

S.N. Piramanayagam, et al., "Grain size reduction in CoCrPt: SiO2 perpendicular recording media with oxide-based intermediate layers," Applied Physics Letters, 2006, pp. 162504-1-162504-3, vol. 89.

(Continued)

*Primary Examiner* — Holly Rickman
(74) *Attorney, Agent, or Firm* — Sughrue Mion, PLLC

(57) ABSTRACT

A perpendicular magnetic recording medium including at least a soft under layer, an orientation control layer, a magnetic recording layer and a protective layer on a non-magnetic substrate, wherein the orientation control layer is composed of three or more layers including a seed layer, a first intermediate layer and a second intermediate layer sequentially, formed in that order from the substrate side, the crystal grains that constitute the first intermediate layer are epitaxially grown on the crystal grains of the seed layer, the crystal grains that constitute the second intermediate layer are epitaxially grown on the crystal grains of the first intermediate layer, and the crystal grains that constitute the second intermediate layer are finer than the crystal grains that constitute the first intermediate layer.

6 Claims, 4 Drawing Sheets

(56) References Cited

U.S. PATENT DOCUMENTS

| | | |
|---|---|---|
| 2005/0142388 A1 | 6/2005 | Hirayama et al. |
| 2005/0214590 A1 | 9/2005 | Maeda et al. |
| 2005/0255336 A1* | 11/2005 | Mukai ............... 428/831 |
| 2006/0057431 A1 | 3/2006 | Tamai et al. |
| 2006/0141292 A1* | 6/2006 | Iwasaki et al. ......... 428/831 |
| 2007/0026260 A1 | 2/2007 | Nemoto et al. |
| 2007/0259214 A1* | 11/2007 | Takahashi et al. ...... 428/831.2 |
| 2009/0052074 A1* | 2/2009 | Nakagawa et al. ........ 360/39 |

FOREIGN PATENT DOCUMENTS

| | | |
|---|---|---|
| JP | 2004-022138 A | 1/2004 |
| JP | 2005-190517 A | 7/2005 |
| JP | 2005-276366 A | 10/2005 |
| JP | 2005-353256 A | 12/2005 |
| JP | 2006-085742 A | 3/2006 |
| JP | 2006-155865 A | 6/2006 |
| JP | 2007-035139 A | 2/2007 |

OTHER PUBLICATIONS

Japanese Office Action issued in Japanese Application No. 2007-226648 mailed Sep. 4, 2012.

* cited by examiner

PERPENDICULAR MAGNETIC RECORDING MEDIUM, METHOD FOR PRODUCING THE SAME, AND MAGNETIC RECORDING/REPRODUCING DEVICE

TECHNICAL FIELD

The present invention relates to a perpendicular magnetic recording medium, a method for producing the same, and a magnetic recording/reproducing device that uses the perpendicular magnetic recording medium.

BACKGROUND ART

In recent years, the range of applications for magnetic recording devices such as magnetic disk devices, flexible disk devices and magnetic tape devices has expanded enormously, and not only has the importance of such devices increased, but the recording density of the magnetic recording media used in these devices has continued to increase markedly. Since the introduction of MR (Magneto Resistance) heads and PRML techniques, the increase in areal recording densities has become even more dramatic. Furthermore, GMR (Giant Magneto Resistance) heads and TuMR (Tunneling Magneto Resistive) heads and the like have been introduced recently, and surface recording densities continue to increase at a pace of 30 to 40% per year.

In this manner, there are strong demands for even higher recording densities for magnetic recording media, and meeting these demands requires further improvements in the coercive force and signal to noise ratio (SNR) of the magnetic recording layer, and higher levels of resolution. In longitudinal magnetic recording systems, which have been widely used until now, as the linear recording density is increased, a self-demagnetizing effect that causes adjacent recording domains of a magnetization transition region to undergo a mutual weakening of magnetization tends to become dominant. In order to avoid this problem, it has been necessary to make the magnetic recording layer progressively thinner, thereby increasing the shape magnetic anisotropy.

On the other hand, as the thickness of the magnetic recording layer is reduced, the size of the energy barrier required to retain the magnetic domain and the size of the thermal energy approach the same level, and therefore, the phenomenon wherein the amount of recorded magnetization is moderated due to the effects of temperature (the thermal fluctuation phenomenon) can no longer be ignored. It is believed that the limit for linear recording density is determined by these types of factors.

Against this background, the use of AFC (Anti Ferromagnetic Coupling) media has recently been proposed as a technique for satisfying the demands for further improvements in the linear recording density of longitudinal magnetic recording systems. In this way, strenuous efforts are being made to avoid the problem of thermal magnetic relaxation, which tends to be a problem in longitudinal magnetic recording.

One powerful technique that is garnering much attention for its potential to enable further increases in areal recording density is the perpendicular magnetic recording technique. In conventional longitudinal magnetic recording systems, the medium is magnetized in the in-plane direction, namely, in a horizontal direction parallel to the surface of the medium, whereas in perpendicular magnetic recording systems, the medium is magnetized in a direction perpendicular to the medium surface. As a result, it is thought that the effects of the self-demagnetizing effect that represents an obstacle to achieving higher linear recording densities in longitudinal magnetic recording systems can be avoided in perpendicular magnetic recording systems, making such perpendicular magnetic recording systems ideal for high density recording. Further, it is also thought that because a certain magnetic layer thickness can be maintained, the effect of thermal magnetic relaxation, which is a significant problem in longitudinal magnetic recording, should be comparatively small.

A perpendicular magnetic recording medium is typically prepared by sequentially providing a seed layer, an intermediate layer, a magnetic recording layer and a protective layer on top of a non-magnetic substrate. Further, after forming the protective layer, a lubricant layer is often applied to the surface of the protective layer. Furthermore, in many cases, a magnetic film known as a soft under layer (SUL) is provided beneath the seed layer.

The intermediate layer is formed for the purpose of further enhancing the properties of the magnetic recording layer. The seed layer controls the crystal orientation of the intermediate layer and the magnetic recording layer, and is said to also have the function of controlling the shape of the magnetic crystals.

In order to produce a perpendicular magnetic recording medium having superior properties, improving the crystal orientation of the magnetic recording layer and reducing the crystal grain size are important factors. In many perpendicular magnetic recording media, a Co alloy material is used for the magnetic recording layer, and the crystal structure adopts a hexagonal close-packed structure. It is important that the (002) crystal plane of the hexagonal close-packed structure is parallel to the substrate surface. In other words, it is important that the crystal c-axis ([002] axis) is aligned along the perpendicular direction with as little disorder as possible.

In order to form crystals of the magnetic recording layer with minimal disorder, Ru has been frequently used as the intermediate layer for the perpendicular magnetic recording medium as it adopts the same hexagonal close-packed structure as conventional magnetic recording layers. Crystals of the magnetic recording layer undergo epitaxial growth on the Ru (002) crystal plane, and therefore, a perpendicular magnetic recording medium having favorable crystal orientation can be obtained (for example, see Patent Document 1).

In other words, improving the degree of orientation of the (002) crystal plane of the Ru intermediate layer also improves the orientation of the magnetic recording layer. Accordingly, improving the recording density of the perpendicular magnetic recording medium requires an improvement in the Ru (002) plane. However, if the Ru is provided directly on top of the amorphous soft under layer, then a thick film is required to obtain superior crystal orientation, and as a result, the non-magnetic Ru weakens the pull of the flux from the head on the soft magnetic material of the soft under layer. Accordingly, conventionally a seed layer oriented in the (111) crystal plane of a face-centered cubic structure has been inserted between the soft under layer and the Ru intermediate layer (for example, see Patent Document 2). The seed layer having a face-centered cubic structure yields a high degree of crystal orientation even with a thin film of approximately 5 (nm), and a Ru layer formed on the seed layer having the face-centered cubic structure has a high degree of crystal orientation even if the layer is thinner than a Ru layer deposited directly on the soft under layer.

Even with a seed layer having the face-centered cubic structure described above, in a conventional seed layer, a single Ru crystal grain of the intermediate layer undergoes epitaxial growth on top of a single crystal grain of the seed layer. Accordingly, one possible method for reducing the crystal grain size of the magnetic recording layer or the crystal grain size of the Ru of the intermediate layer involves reducing the crystal grain size of the seed layer. However, although numerous investigations have been conducted into reducing the crystal grain size, both in terms of the materials used for the seed layer and the intermediate layer, and the methods used for forming these layers, a technique for reducing the crystal grain size of the seed layer while maintaining favorable crystal orientation properties for the intermediate layer and the magnetic recording layer has not been realized yet.

One other reported method of reducing the crystal grain size of the intermediate layer and magnetic recording layer formed on the seed layer is the type of method typically employed for magnetic recording layers, namely, a method that employs a granular structure within the intermediate layer composed of crystal grain portions of Ru or the like, and grain boundary portions of an oxide or the like that surround the crystal grain portions (for example, see non-patent document 1). With this method, by increasing the amount of the oxide and thickening the grain boundary portion of the intermediate layer, the crystal grain size can be reduced by a corresponding amount. Moreover, if an oxide magnetic layer such as $CoCrPt$—$SiO_2$ is formed on top of the intermediate layer, then the granular structure continues from the intermediate layer through to the magnetic recording layer, which promotes a reduction in the grain size of the magnetic crystal grains and segregation of the oxide, and can be expected to yield reduced noise, resulting in improved recording and reproduction properties.

However, this conversion of the intermediate layer to a granular structure does not represent a reduction in the grain size of the seed layer. Accordingly, the number of crystal grains per unit of surface area does not change. As a result, when future increases are made in the recording density, the number of magnetic crystal grains within a single bit will decrease, causing a reduction in the signal. Furthermore, increasing the relative proportion of the oxide grain boundary portions may cause oxidation of the Co of the magnetic crystal grains, resulting in a further reduction in the signal. Improving recording and reproduction properties to cope with the increase of recording densities requires not only a simple reduction in the grain size of the magnetic crystal grains, but also an increase in the number of crystal grains, namely, an increase in the density of the magnetic crystal grains.

Patent Document 3 discloses a method that uses Mg or Ti that adopts a hexagonal close-packed structure as the seed layer material, and then utilizes the poor wettability between these materials and the Ru used as the intermediate layer material to enable the average grain size of the Ru of the intermediate layer to be reduced to approximately 8 (nm) while maintaining favorable crystal orientation. However, as the thickness of the intermediate layer is increased, the reduced size Ru crystals formed on the seed layer including Mg or Ti tend to readily coalesce with surrounding Ru crystals. As a result, each single magnetic crystal grain tends to undergo epitaxial growth not on a single Ru crystal grain within the intermediate layer, but rather on a plurality of coalesced Ru crystal grains. Because this means that there is no effective reduction in the size of the magnetic crystal grains, the expected dramatic improvements in the recording and reproduction properties tend not to be observed.

Achieving further improvements in the recording and reproduction properties requires a perpendicular magnetic recording medium having excellent recording and reproduction properties, which combines a reduced crystal grain size for the magnetic crystal grains with increased density, while also maintaining or improving the perpendicular orientation properties for the magnetic recording layer. A perpendicular magnetic recording medium that is able to resolve the above issues and is also able to be produced easily has been keenly sought.

[Patent Document 1]
Japanese Unexamined Patent Application, First Publication No. 2001-6158
[Patent Document 2]
Japanese Unexamined Patent Application, First Publication No. 2005-190517
[Patent Document 3]
Japanese Unexamined Patent Application, First Publication No. 2006-155865
[Non-Patent Document 1]
Applied Physics Letters, vol. 89, page 162504.

DISCLOSURE OF INVENTION

Problem to be Solved by the Invention

The present invention takes the above circumstances into consideration, with an object of providing a perpendicular magnetic recording medium which, by combining a reduced crystal grain size for the magnetic crystal grains with an increased density, while retaining favorable perpendicular orientation properties for the magnetic recording layer, is capable of recording and reproducing information at a high density, as well as providing a method for producing such a perpendicular magnetic recording medium and a magnetic recording/reproducing device.

Means to Solve the Problems

In order to achieve the above object, the present invention adopts the aspects described below.

(1) A perpendicular magnetic recording medium, including at least a soft under layer, an orientation control layer, a magnetic recording layer and a protective layer provided on a non-magnetic substrate, wherein said orientation control layer comprises three or more layers including a seed layer, a first intermediate layer and a second intermediate layer, formed in that order from a side of said substrate, a plurality of crystal grains that constitute said first intermediate layer are epitaxially grown on each single crystal grain of said seed layer, each single crystal grain that constitutes said second intermediate layer is epitaxially grown on a single crystal grain of said first intermediate layer, each single crystal grain that constitutes said magnetic recording layer is epitaxially grown on a single crystal grain of said second intermediate layer, and crystal grains that constitute said second intermediate layer are finer than crystal grains that constitute said first intermediate layer.

(2) A perpendicular magnetic recording medium according to (1) above, wherein the average crystal grain size of the seed layer is not less than 10 nm.

(3) A perpendicular magnetic recording medium according to (1) or (2) above, wherein the average crystal grain size of the second intermediate layer is within a range from 1 to 7 nm.

(4) A perpendicular magnetic recording medium according to any one of (1) to (3) above, wherein the seed layer has a hexagonal close-packed structure or a face-centered cubic structure.

(5) A perpendicular magnetic recording medium according to any one of (1) to (4) above, wherein the second intermediate layer has a hexagonal close-packed structure or a face-centered cubic structure, and the crystal grains of the second intermediate layer are isolated from the surrounding crystal grains by at least one of an oxide, a nitride or a void.

(6) A perpendicular magnetic recording medium according to any one of (1) to (5) above, wherein in the second intermediate layer, a granular structure is formed composed of crystal grains having a hexagonal close-packed structure or a face-centered cubic structure, and grain boundary portions formed from an oxide of at least one element selected from the group consisting of Al, B, Bi, Ca, Cr, Fe, Hf, Mg, Mo, Nb, Ru, Si, Ta, Ti, W and Zr.

(7) A perpendicular magnetic recording medium according to any one of (1) to (6) above, wherein in the magnetic recording layer, a granular structure is formed composed of ferromagnetic crystal grains, and crystal grain boundary portions formed from a non-magnetic oxide.

(8) A perpendicular magnetic recording medium according to any one of (1) to (7) above, wherein the soft under layer is composed of a soft magnetic film, and the soft magnetic film has an amorphous structure.

(9) A perpendicular magnetic recording medium according to any one of (1) to (8) above, wherein the seed layer has a hexagonal close-packed structure, and is composed of elemental Mg, or of an alloy material containing Mg and at least one element selected from the group consisting of Y, Ti, Zr, Hf, Cr, Mo, W, V, Nb, Ta, Al, Ru, Re and Mn.

(10) A perpendicular magnetic recording medium according to any one of (1) to (8) above, wherein the seed layer has a hexagonal close-packed structure, and is composed of elemental Ti, or of an alloy material containing Ti and at least one element selected from the group consisting of Y, Mg, Zr, Hf, Cr, Mo, W, V, Nb, Ta, Al, Ru, Re and Mn.

(11) A perpendicular magnetic recording medium according to any one of (1) to (8) above, wherein the seed layer has a face-centered cubic structure, and is composed of elemental Al, or of an alloy material containing Al and at least one element selected from the group consisting of Y, Mg, Ti, Zr, Hf, Cr, Mo, W, V, Nb, Ta, Ru, Re and Mn.

(12) A perpendicular magnetic recording medium according to any one of (1) to (11) above, wherein the first intermediate layer is formed from Ru, Re, or an alloy thereof, and has a hexagonal close-packed structure.

(13) A perpendicular magnetic recording medium according to any one of (1) to (11) above, wherein
the first intermediate layer contains, as the main constituent, at least one element selected from the group of elements having a face-centered cubic structure, is formed from an alloy material of the element of this main constituent and an element selected from the group of elements having a body-centered cubic structure, and
has a structure that combines a crystal structure oriented in the (111) crystal plane, and stacking faults composed of a mixture of a face-centered cubic structure and a body-centered cubic structure.

(14) A perpendicular magnetic recording medium according to any one of (1) to (11) above, wherein
the first intermediate layer contains, as the main constituent, at least one element selected from the group of elements having a face-centered cubic structure, is formed from an alloy material of the element of this main constituent and an element selected from the group of elements having a hexagonal close-packed structure, and
has a structure that combines a crystal structure oriented in the (111) crystal plane, and stacking faults composed of a mixture of a face-centered cubic structure and a hexagonal close-packed structure.

(15) A perpendicular magnetic recording medium according to any one of (1) to (11) above in which the seed layer has a hexagonal close-packed structure or a face-centered cubic structure, wherein
the first intermediate layer is formed from an element selected from the group of elements having a body-centered cubic structure, or an alloy material thereof,
the second intermediate layer is formed from an element selected from the group of elements having a hexagonal close-packed structure, or an alloy material thereof, and
the second intermediate layer is formed on the first intermediate layer.

(16) A method for producing a perpendicular magnetic recording medium, comprising forming at least a soft under layer, an orientation control layer, a magnetic recording layer and a protective layer on a non-magnetic substrate, wherein
said orientation control layer is formed by using a sputtering method to deposit three or more layers including a seed layer, a first intermediate layer and a second intermediate layer, in that order from a side of said substrate,
a plurality of crystal grains that constitute said first intermediate layer are epitaxially grown on each single crystal grain of said seed layer,
a single crystal grain that constitutes said second intermediate layer is epitaxially grown on each single crystal grain of said first intermediate layer,
a single crystal grain that constitutes said magnetic recording layer is epitaxially grown on each single crystal grain of said second intermediate layer, and
by increasing a sputtering gas pressure during deposition of said second intermediate layer to a level higher than a sputtering gas pressure used during deposition of said first intermediate layer, crystal grains that constitute said second intermediate layer are reduced in size compared with crystal grains that constitute said first intermediate layer.

(17) A magnetic recording/reproducing device including a perpendicular magnetic recording medium and a magnetic head which records and reproduces information on the perpendicular magnetic recording medium, wherein the perpendicular magnetic recording medium is a perpendicular magnetic recording medium according to any one of (1) to (15) above.

The aforementioned (1) and (16) represent a first and second aspect of the present invention, whereas the configurations described in (2) to (15) and (17) represent preferred examples of the present invention. In other words, these do not represent essential conditions of the present invention, and the invention is not limited to only the configurations described in (2) to (15).

Effect of the Invention

The present invention is able to provide a perpendicular magnetic recording medium having superior high recording density properties, in which the crystal c-axis of the crystal structure of the magnetic recording layer, and particularly a hexagonal close-packed structure, is oriented with small angular dispersion relative to the substrate plane, and in which the crystal grains that constitute the magnetic recording layer exhibit a high density while having an extremely small average grain size.

DESCRIPTION OF THE REFERENCE SYMBOLS

| | |
|---|---|
| 1 | Non-magnetic substrate |
| 2 | Soft under layer |
| 3 | Seed layer |
| 4 | First intermediate layer |
| 5 | Second intermediate layer |
| 6 | Magnetic recording layer |
| 7 | Protective layer |
| 9 | Orientation control layer |
| 10 | Perpendicular magnetic recording medium |
| 11 | Medium drive unit |
| 12 | Magnetic head |
| 13 | Head drive unit |
| 14 | Recording/reproducing signal system |
| 15 | Magnetic recording/reproducing device |

BEST MODE FOR CARRYING OUT THE INVENTION

Figure 1:
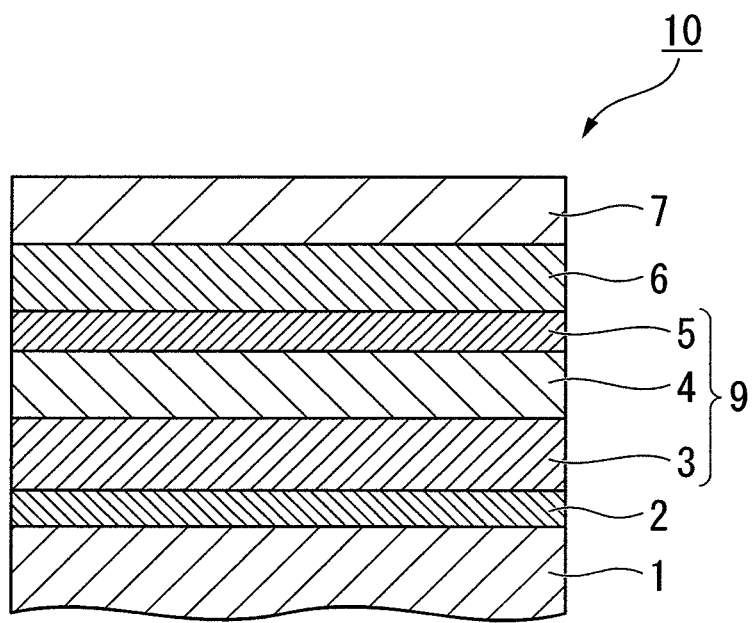
FIG. 1 is a cross-sectional schematic view of an embodiment of a perpendicular magnetic recording medium according to the present invention.
Figure 2:
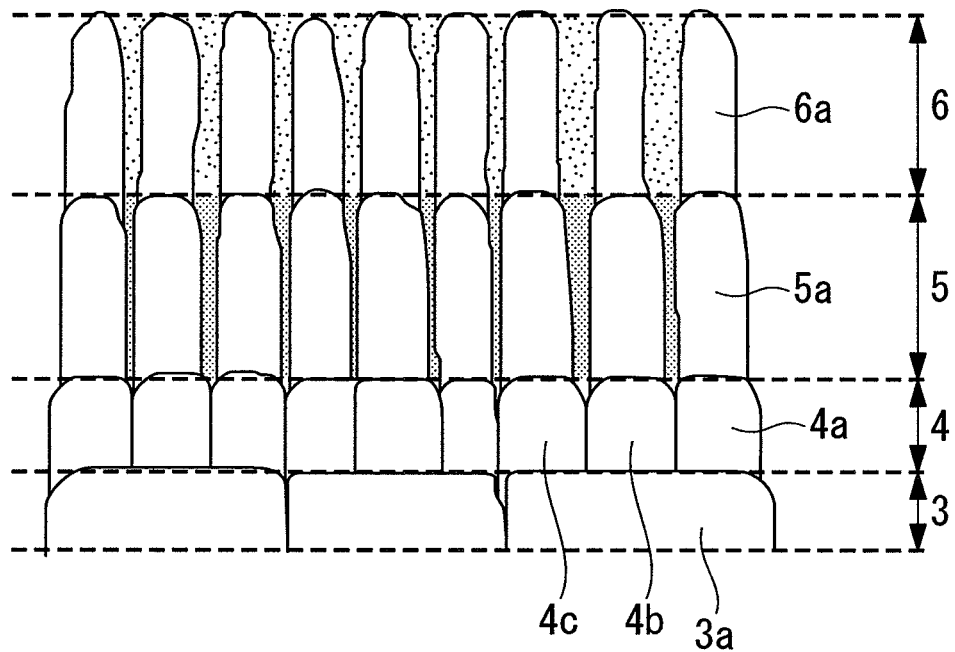
FIG. 2 is an expanded schematic view of a cross-section of an embodiment of a perpendicular magnetic recording medium according to the present invention.

A perpendicular magnetic recording medium that represents one example of an embodiment of the present invention is described below with reference to the drawings. FIG. 1 is a cross-sectional schematic view of one example of the perpendicular magnetic recording medium according to the present invention. Further, FIG. 2 is an expanded schematic view of a cross-section of one example of the perpendicular magnetic recording medium according to the present invention.

As illustrated in FIG. 1, a perpendicular magnetic recording medium 10 that represents one example of the present invention includes at least a soft under layer 2, an orientation control layer 9 composed of a seed layer 3, a first intermediate layer 4 and a second intermediate layer 5, a magnetic recording layer 6, and a protective layer 7 formed on a non-magnetic substrate 1.

FIG. 1 is merely a drawing used for explaining the configuration of the perpendicular magnetic recording medium 10 of this embodiment of the present invention, and the size, thickness and dimensions of each of the elements illustrated in the drawing may differ from the dimensional relationship within the actual perpendicular magnetic recording medium 10. A detailed description of each layer of the perpendicular magnetic recording medium 10 is provided below.

(Non-Magnetic Substrate)

There are no particular restrictions on the non-magnetic substrate 1 in the present embodiment, and any non-magnetic substrate may be used according to need. Examples thereof include substrates containing Al as the main constituent such as Al alloy substrates such as an Al—Mg alloy substrate, and substrates formed from conventional soda glass, aluminosilicate glass, crystallized glass, amorphous glass, silicon, titanium, ceramics, sapphire, quartz, or any of a variety of resins.

The use of an Al alloy substrate or a crystallized glass substrate or a glass substrate such as amorphous glass is preferred. In the case of a glass substrate, mirror-polished substrates and low Ra substrates in which the surface roughness (Ra) is less than 1 (Å) are particularly desirable. The substrate may be textured, provided the degree of texturing is light.

In a production process for a magnetic disk, the substrate is usually first cleaned and dried. This also applies in the present invention, and from the viewpoint of ensuring favorable adhesion of each of the layers, it is preferable that the cleaning and drying of the substrate is preferably performed prior to the formation of the layers. The term "cleaning" can include not only washing with water, but also cleaning performed using etching (reverse sputtering). There are no particular limitations on the substrate size.

(Soft Under Layer)

When a signal is recorded on the medium, the soft under layer 2 of the present embodiment has the function of guiding the recording magnetic field from the head, and efficiently applying the perpendicular component of the magnetic field to the magnetic recording layer 6. The soft under layer 2 may be formed from any suitable material according to need, although a so-called soft magnetic film formed from a material having soft magnetic properties, such as a FeCo-based alloy, CoZrNb-based alloy or CoTaZr-based alloy, is preferred. Moreover, the soft under layer 2 preferably has an amorphous (non-crystalline) structure. By employing an amorphous structure, increases in the surface roughness (Ra) can be prevented, and the head floating height can be reduced, enabling a further increase in the recording density.

Moreover, the soft under layer 2 may be a single layer, or may have a multi-layer structure if required. For example, a structure in which an extremely thin non-magnetic film of Ru or the like is sandwiched between two layers, thereby causing anti ferromagnetic coupling (AFC) between the two soft magnetic layers, may be used as the soft under layer. The overall thickness of the soft under layer 2 may be selected according to need, but is preferably within a range from approximately 20 (nm) to 120 (nm), and may be determined on the basis of achieving a favorable balance between the recording and reproduction properties and the overwrite (OW) properties.

(Orientation Control Layer)

The orientation control layer 9 of the present embodiment is provided on the soft under layer 2, and controls the orientation of the film (the magnetic recording layer 6) provided directly on the orientation control layer 9. The orientation control layer 9 is composed of a plurality of layers, and includes the seed layer 3, the first intermediate layer 4 and the second intermediate layer 5 laminated in sequence from the side of the non-magnetic substrate 1. In this description, the combination of the first intermediate layer 4 and the second intermediate layer 5 is sometimes referred to as simply "the intermediate layer".

(Seed Layer)

The seed layer 3 of the present embodiment is preferably a polycrystalline structure having a hexagonal close-packed structure or a face-centered cubic structure. The (002) crystal orientation plane that represents the closest packed plane of a hexagonal close-packed structure, and the (111) crystal orientation plane that represents the closest packed plane of a face-centered cubic structure are geometrically equivalent. Accordingly, by using a seed layer 3 having either a hexagonal close-packed structure or a face-centered cubic structure, the (002) crystal orientation of the Ru that is widely used for the intermediate layer and the Co alloy used for the magnetic recording layer can be improved.

The material for forming the seed layer 3 may be selected according to need, and examples of materials that may be used include elemental Mg, Mg alloy materials containing Mg and at least one element selected from the group consisting of Y, Ti, Zr, Hf, Cr, Mo, W, V, Nb, Ta, Al, Ru, Re and Mn, elemental Ti, Ti alloy materials containing Ti and at least one element selected from the group consisting of Y, Mg, Zr, Hf, Cr, Mo, W, V, Nb, Ta, Al, Ru, Re and Mn, elemental Al, and Al alloy materials containing Al and at least one element selected from the group consisting of Y, Mg, Ti, Zr, Hf, Cr, Mo, W, V, Nb, Ta, Ru, Re and Mn. Of the above materials, elemental Mg, Mg alloy materials, elemental Ti and Ti alloy materials have a hexagonal close-packed structure, whereas elemental Al and Al alloy materials have a face-centered cubic structure.

As illustrated in FIG. 2, in the present embodiment, a plurality of crystal grains 4a to 4c of the intermediate layer (the first intermediate layer 4) are epitaxially grown on top of a single crystal grain 3a of the polycrystalline seed layer 3. Accordingly, the average crystal grain size of the crystal grains 3a of the seed layer 3 may be selected as required, but is preferably not less than 10 nm. The average crystal grain size is more preferably not less than 10 nm and not more than 20 nm, and still more preferably not less than 10 mn and not more than 16 nm. Here, the average crystal grain size is determined by inspecting the crystalline shape of the layer using a transmission electron microscope (TEM) or the like, measuring the diameter of those crystal grains that can be clearly distinguished, and then statistically processing the plurality of diameter values to determine an average value.

(Intermediate Layer)

The intermediate layer of the present embodiment is composed of at least two intermediate layers, that is, the intermediate layer is composed of the first intermediate layer 4 and the second intermediate layer 5 formed in that order from the side of the non-magnetic substrate 1.

Because the crystal orientation of the magnetic recording layer 6 laminated on the intermediate layer is determined substantially by the crystal orientation of the intermediate layer, controlling the orientation of this intermediate layer is an extremely important factor in producing the perpendicular magnetic recording medium 10.

(First Intermediate Layer)

The first intermediate layer 4 of the present embodiment is formed on the seed layer 3.

The material for forming the first intermediate layer 4 may be selected according to need, and examples of materials that may be used include Ru, Re, and alloys having stacking faults. Elements having a body-centered cubic structure such as Cr, Mo, W, V, Nb and Ta, and alloys of these elements, may also be used.

The first intermediate layer 4 may also be formed as a laminate prepared by laminating a plurality of thin films of Ru, Re and/or alloy materials thereof. It is preferable that the first intermediate layer 4 is oriented in the (002) crystal plane of a hexagonal close-packed structure.

Furthermore, the first intermediate layer 4 preferably contains, as the main constituent, at least one element selected from the group of elements having a face-centered cubic structure, is preferably formed from an alloy material of the element of this main constituent and an element selected from the group of elements having a body-centered cubic structure, and is preferably a layer that combines a crystal structure oriented in the (111) crystal plane, and stacking faults (laminate defect) composed of a mixture of a face-centered cubic structure and a body-centered cubic structure.

Moreover, in another aspect, the first intermediate layer 4 preferably contains, as the main constituent, at least one element selected from the group of elements having a face-centered cubic structure, is preferably formed from an alloy material of the element of this main constituent and an element selected from the group of elements having a hexagonal close-packed structure, and is preferably a layer that combines a crystal structure oriented in the (111) crystal plane, and stacking faults (laminate defect) composed of a mixture of a face-centered cubic structure and a hexagonal close-packed structure.

In either of the aspects described above, the crystal orientation plane of the first intermediate layer preferably matches that of the seed layer 3 having a hexagonal close-packed structure or face-centered cubic structure, thereby ensuring favorable orientation properties. Such intermediate layers are preferable since they enables the magnetic recording layer 6 to be formed as very fine crystal grains.

Preferred examples of the aforementioned group of elements having a face-centered cubic structure include Pt, Pd and Ni and the like, preferred examples of the group of elements having a body-centered cubic structure include Nb, Mo and Cr and the like, and examples of the group of elements having a hexagonal close-packed structure include Re, Hf and Zr and the like.

As illustrated in FIG. 2, a plurality of crystal grains 4a to 4c of the first intermediate layer 4 are preferably epitaxially grown on top of each crystal grain 3a having an average crystal grain size of not less than 10 nm within the seed layer 3, and in order to achieve such a configuration, the wettability of the material of the intermediate layer (the first intermediate layer 4) relative to the material of the seed layer 3 is preferably poor. The contact angle is typically used as an indicator for evaluating wettability.

Here, the "contact angle" describes a value determined by dripping the melted material of the first intermediate layer 4 onto a solid sample of the material of the seed layer 3, and evaluating the contact angle of the drop of the material of the first intermediate layer 4 relative to the solid surface of the material of the seed layer 3.

The description of the wettability as being "poor" describes a state in which the contact angle is large. In the present embodiment, it is particularly desirable that when the conventional material Ru is used as the material for the first intermediate layer 4, the Ru contact angle relative to the element which is the main constituent of the seed layer 3 is within a range from 50 to 120 degrees.

Using a material that exhibits poor wettability relative to the material of the seed layer 3 as the material for the first intermediate layer 4 facilitates the formation of fine crystal grains when the first intermediate layer 4 is laminated on top of the seed layer 3.

The thickness of the first intermediate layer 4 may be selected according to need, but is preferably within a range from 1 to 15 nm, and more preferably from 5 to 10 nm. Provided the thickness of the first intermediate layer 4 is within the range from 1 to 15 nm, the crystal orientation of the first intermediate layer 4 can be improved, while coalescence of the crystal grains can be suppressed.

During formation of the first intermediate layer 4, the formation is preferably conducted under low gas pressure conditions, and the gas pressure is preferably not more than 1 Pa. The gas pressure is preferably as low as possible, and in one usage example, the gas pressure is preferably set within a range from approximately 0.1 to 0.6 Pa. provided the gas pressure during formation of the first intermediate layer 4 is not more than 1 Pa, the crystal orientation properties of the first intermediate layer 4 can be preferably improved.

(Second Intermediate Layer)

The second intermediate layer 5 of the present embodiment is formed on the first intermediate layer 4. The average crystal grain size of the second intermediate layer 5 may be selected according to need, but is preferably within a range from 1 to 7 nm. Provided the average crystal grain size is within this range, the magnetic recording layer 6 described below, which is laminated on the second intermediate layer 5, can be formed with a very fine crystal grain structure.

Further, the second intermediate layer 5 preferably has a hexagonal close-packed structure or face-centered cubic structure, and the crystal grains of the second intermediate layer are preferably isolated from the surrounding crystal grains by an oxide, a nitride and/or a void. Such a configuration is preferred, as it enables increases in the crystal grain size (crystal grain coarsening) caused by the coalescence of multiple crystal grains within the second intermediate layer to be suppressed.

Moreover, the second intermediate layer 5 is preferably formed as a granular structure composed of crystal grains having a hexagonal close-packed structure or face-centered cubic structure, and an oxide of at least one element selected from the group consisting of Al, B, Bi, Ca, Cr, Fe, Hf, Mg, Mo, Nb, Ru, Si, Ta, Ti, W and Zr, which exists at the grain boundary portions. This type of structure is preferred, as it enables the magnetic recording layer 6 formed on the second intermediate layer 5 to be formed as very fine crystal grains.

In those cases where the seed layer 3 is a material having a hexagonal close-packed structure or a face-centered cubic structure, the first intermediate layer 4 formed directly on the seed layer 3 can be formed using an element having a body-centered cubic structure such as Cr, Mo, W, V, Nb or Ta, or an alloy material of these elements.

In such a case, the second intermediate layer 5 is preferably formed using an element selected from the group of elements having a hexagonal close-packed structure, or an alloy material thereof. On the seed layer 3 having a hexagonal close-packed structure or face-centered cubic structure, a slight lattice displacement occurs between the (110) crystal orientation plane of the first intermediate layer 4 having a body-centered cubic structure and the (002) crystal orientation plane of the second intermediate layer 5 having a hexagonal close-packed structure. As a result, coalescence of multiple crystal grains in the intermediate layers is suppressed, enabling the magnetic recording layer 6 described below to be formed as very fine crystal grains.

As described above, in order to improve the crystal orientation properties of the overall intermediate layer, the gas pressure during formation of the first intermediate layer 4, which represents the initial growth stage of the intermediate layer, is preferably low.

However, if the crystal growth is continued with the gas pressure in a low state, then the plurality of crystal grains of the intermediate layer on the seed layer 3 are more likely to undergo coalescence during the crystal growth process. The crystal grains of the magnetic recording layer 6 formed on such coalesced crystals of the intermediate layer undergo epitaxial growth as single crystals, meaning a problem arises in that the size of the crystal grains of the magnetic recording layer 6 increases to substantially the crystal grain size of the coalesced crystal grains of the intermediate layer.

Accordingly, the gas pressure during deposition of the second intermediate layer 5 is preferably not less than 1.5 Pa, more preferably not less than 3 Pa, and still more preferably not less than 5 Pa and not more than 10 Pa. By ensuring that the gas pressure during deposition of the second intermediate layer 5 is not less than 1.5 Pa, voids are generated between the crystal grains within the intermediate layer, thereby suppressing coalescence of the crystal grains.

Furthermore, in those cases where the crystal grains of the second intermediate layer 5 are surrounded by grain boundaries of an oxide or a nitride, or cases where granular structures are formed from these materials, not only can the coalescence of multiple crystal grains within the second intermediate layer 5 be prevented, but the width of the grain boundary portions can be increased, enabling a further reduction in the size of the crystal grains.

As illustrated in FIG. 2, in the present embodiment, by suppressing coalescence of the crystal grains of the intermediate layer, a single fine crystal grain 5a of the second intermediate layer 5 is epitaxially grown on top of a single fine crystal grain 4a of the first intermediate layer 4, and a single crystal grain 6a of the magnetic recording layer 6 is then epitaxially grown on top of a single crystal grain 5a of the second intermediate layer 5, meaning a combination of increased density of crystal and reduced grain size can be achieved for the magnetic recording layer 6.

(Magnetic Recording Layer)

The magnetic recording layer 6 of the present embodiment is the layer in which a signal is actually recorded, and the axis of easy magnetization (the crystal c-axis) is oriented substantially perpendicularly to the plane of the non-magnetic substrate 1. Accordingly, the crystal structure and magnetic properties of the magnetic recording layer 6 ultimately determine the recording and reproduction properties.

The material for the magnetic recording layer 6 may be selected according to need, and examples of the material include thin films of Co-based alloys such as CoCr, CoCrPt, CoCrPtB, CoCrPtB—X, CoCrPtB—X—Y, CoCrPt—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt-$Ai_2O_3$, CoCrPt—$B_2O_3$, CoCrPt—$WO_2$, and CoCrPt—$WO_3$. In the above materials, X represents Ru or W or the like, and Y represents Cu or Mg or the like.

Particularly in those cases where an oxide magnetic layer is used as the material for the magnetic recording layer 6, it is preferable that a granular structure is formed such that the non-magnetic oxide crystal grain boundary portions surrounds the ferromagnetic Co crystal grains. This weakens the magnetic interaction between the Co crystal grains, and can therefore reduce noise.

Further, the crystal structure of the magnetic recording layer 6 is preferably a hexagonal close-packed structure, wherein the (002) crystal plane is parallel to the substrate surface, namely, wherein the crystal c-axis ([002] axis) is aligned along the perpendicular direction with as little disorder as possible.

The full width at half maximum of a rocking curve can be used as a method of evaluating the crystal structure. Firstly, the formed film on the substrate is placed inside an X-ray diffraction apparatus, and the crystal plane parallel to the substrate surface is analyzed. In those cases where the sample being evaluated includes films that adopt a hexagonal close-packed structure such as the intermediate layer and magnetic recording layer 6 described above, the diffraction peaks corresponding with these crystal planes are observed. In the case of a perpendicular magnetic recording medium 10 that uses a Co-based alloy, because the c-axis ([0002] axis) direction of the hexagonal close-packed structure is oriented perpendicularly relative to the substrate surface, a peak that corresponds with the (002) plane is observed.

Subsequently, the substrate surface is swung relative to the optical system while the Bragg angle causing the diffraction of the (002) plane is maintained. By plotting the (002) crystal plane diffraction intensity against the inclination angle of the optical system, a single diffraction peak (called a rocking curve) can be drawn.

When the (002) crystal plane is aligned well in an extremely parallel relationship with the substrate surface, a rocking curve with a very sharp peak is obtained. On the other hand, in those cases where the alignment of the (002) crystal plane is dispersed broadly, a broad rocking curve is obtained.

Accordingly, the full width at half maximum $\Delta\theta 50$ for the rocking curve can be used as an indicator of the quality of the crystal orientation of the perpendicular magnetic recording medium 10. The smaller this $\Delta\theta 50$ value is, the better the orientation of the perpendicular magnetic recording medium 10.

The methods used for forming the soft under layer 2, the seed layer 3, the first intermediate layer 4, the second intermediate layer 5 and the magnetic recording layer 6 may be selected as appropriate. Typically, a DC magnetron sputtering method or RF sputtering method is used. Further, an RF bias, DC bias, pulsed DC, pulsed DC bias, $O_2$ gas, $H_2O$ gas, $H_2$ gas or $N_2$ gas may also be used.

The sputtering gas pressure during film formation is preferably determined so as to optimize the properties of each layer. The gas pressure is typically controlled within a range from approximately 0.1 to 30 (Pa), and is adjusted in accordance with the performance of the perpendicular magnetic recording medium 10.

(Protective Layer)

The protective layer 7 in the present embodiment is provided to protect the perpendicular magnetic recording medium 10 from damage caused by contact between the magnetic head and the perpendicular magnetic recording medium 10. The material for the protective layer 7 may be selected according to need, although the use of a carbon film or $SiO_2$ film is preferred, and a carbon film is particularly desirable.

The method used for forming the protective film of the protective layer 7 may be selected according to need, and methods such as sputtering methods and plasma CVD methods can be used, although a plasma CVD method is particularly desirable. A magnetron plasma CVD method may also be used.

The thickness of the protective layer 7 is preferably within a range from 1 to 10 (nm), more preferably from 2 to 6 (nm), and still more preferably from 2 to 4 (nm).

(Magnetic Recording/Reproducing Device)

Figure 3:
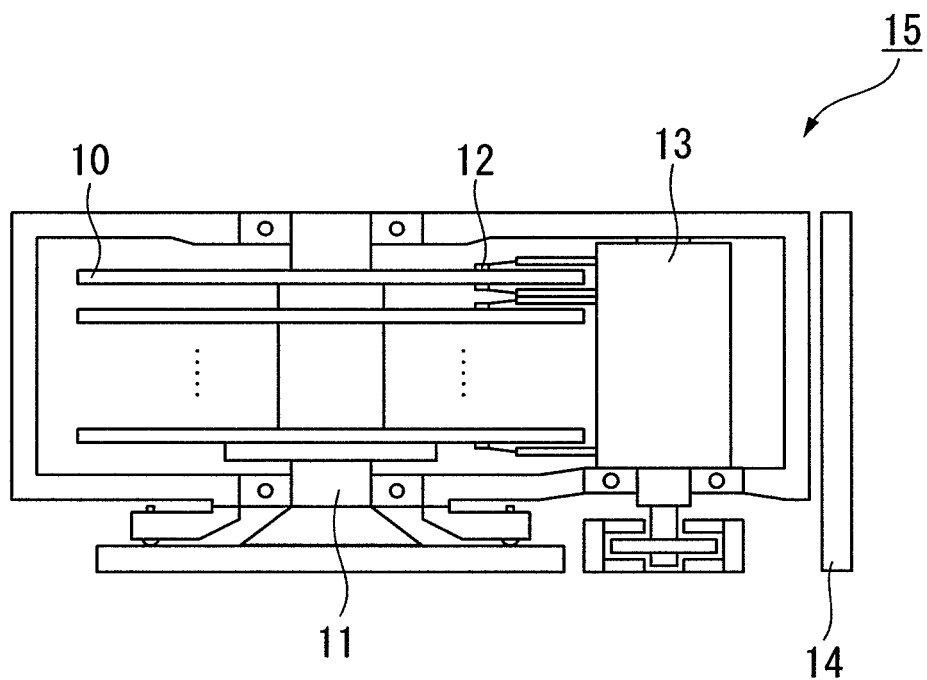
FIG. 3 is a cross-sectional schematic view of an example of a magnetic recording/reproducing device that uses a perpendicular magnetic recording medium 10 according to the above embodiment.

FIG. 3 is a cross-sectional schematic view of an example of a magnetic recording/reproducing device that uses the above perpendicular magnetic recording medium 10. The magnetic recording/reproducing device 15 illustrated in FIG. 3 includes the perpendicular magnetic recording medium 10 having the structure illustrated in FIG. 1, a medium drive unit 11 that rotates the perpendicular magnetic recording medium 10, a magnetic head 12 that records or reproduces information on the perpendicular magnetic recording medium 10, a head drive unit 13 that moves the magnetic head 12 relative to the perpendicular magnetic recording medium 10, and a recording/reproducing signal processing system 14.

The recording/reproducing signal processing system 14 can process data input from externally and transmit this data as recording signals to the magnetic head 12, as well as processing reproduction signals from the magnetic head 12 and transmitting the resulting data externally.

The magnetic head 12 used in the magnetic recording/reproducing device 15 of the present invention may be selected according to need, and examples of the magnetic head include not only magnetic heads that include, as the reproducing element, a magneto resistance (MR) element that uses an anisotropic magneto resistance effect (AMR), but also magnetic heads that are ideal for high recording densities and include a GMR (giant magneto resistance) element that uses a GMR effect, or a TuMR (tunnel magneto resistance) element that uses a tunneling effect or the like.

As described above, according to the perpendicular magnetic recording medium 10 of the present embodiment, the crystal structure of the magnetic recording layer 6, and in particular the crystal c-axis of a hexagonal close-packed structure, is oriented with minimal angular dispersion relative to the surface of the non-magnetic substrate 1, and the crystal grains that constitute the magnetic recording layer 6 exhibit a high density while having an extremely small average grain size, and therefore a perpendicular magnetic recording medium 10 having excellent high recording density properties can be provided.

EXAMPLES

The effects of the present invention are described in detail below based on a series of examples. However, the present invention is in no way limited to the examples presented below, and various modifications can be performed within the scope of the present invention.

Example 1, Comparative Example 1

24 HD glass substrates were prepared. These HD glass substrates were set inside a vacuum chamber, and the chamber was evacuated down to a pressure of not more than $1.0 \times 10^{-5}$ (Pa).

A sputtering method was then used to deposit a soft under layer of CoTaZr having a film thickness of 50 (nm) on each substrate, with the deposition conducted under an Ar atmosphere at a gas pressure of 0.6 (Pa).

Subsequently, a seed layer of Mg, Ti or Al with a thickness of 10 (nm) was deposited on each of the soft under layers under an Ar atmosphere at a gas pressure of 0.6 (Pa), and a first intermediate layer of Ru was then deposited on each of the seed layers (examples 1-1 to 1-3).

A second intermediate layer of Ru, Ru-3$SiO_2$, Ru-3$Cr_2O_3$, Ru-3$TiO_2$, Ru-6$SiO_2$, Ru-6$Cr_2O_3$ or Ru-6$TiO_2$ (mol %) with a thickness of 15 (nm) was then deposited on the first intermediate layer of each of the three types of substrate under an Ar atmosphere at a gas pressure of 5 (Pa) (examples 1-1-1 to 1-3-7).

As comparative examples, a second intermediate layer of Ru with a thickness of 15 (nm) was deposited on the first intermediate layer of each of the three types of substrate under an Ar atmosphere at a gas pressure of 0.6 (Pa) (comparative examples 1-1 to 1-3).

A layer of CoCrPt—$SiO_2$ was then deposited as the magnetic recording layer on top of each of the second intermediate layers, and then a protective layer composed of a carbon film was deposited on top of the magnetic recording layer, thus completing production of a series of perpendicular magnetic recording media.

A lubricant was applied to each of the perpendicular magnetic recording media (examples 1-1-1 to 1-3-7, and comparative examples 1-1 to 1-3) and the recording and reproduction properties of the perpendicular magnetic recording media were evaluated using a Read/Write Analyzer 1632 and a Spin Stand S1701MP manufactured by Guzik Technical Enterprises, USA.

Subsequently, the static magnetic properties of the perpendicular magnetic recording media were evaluated using a Kerr measuring apparatus (manufactured by Neoark Corporation (Japan)).

Furthermore, in order to examine the crystal orientation of the Co-based alloy of the magnetic recording layer, a rocking curve for the magnetic layer was measured using an X-ray diffractometer (X'Pert, manufactured by PAnalytical B.V., Holland).

Moreover, a planar TEM image was also captured for each magnetic recording layer, second intermediate layer and seed layer, and these images were used to measure the crystal grain sizes for the Co-based alloy of the magnetic recording layer, the Ru of the second intermediate layer, and the seed layer.

the second intermediate layer was relatively small, the crystal grain size of the Co formed on the second intermediate layer had not been reduced in size. It is thought that this indicates that single Co crystal grains had undergone epitaxial growth on a plurality of Ru crystal grains that had bonded together.

In examples 1-1-1 to 1-3-7, the reduction in the grain size of the Co of the magnetic recording layer reduced the noise and improved the SNR. Larger SNR values represent superior results. Further, although the examples exhibited lower coercive force values than the comparative examples, the crystal orientation properties were favorably maintained. Accordingly, it is thought that reducing the crystal grain size of the Co of the magnetic recording layer makes the structure more susceptible to the effects of thermal fluctuation, resulting in a reduction in the apparent coercive force.

TABLE 1

| Sample | Seed layer (structure) | First intermediate layer | Second intermediate layer | SNR (dB) | Hc (Oe) | Δθ50 (deg.) | Average grain size of seed layer (nm) | Average grain size of Ru crystals (nm) | Average grain size of Co crystals (nm) |
|---|---|---|---|---|---|---|---|---|---|
| Example 1-1-1 | Mg (hcp) | Ru (0.6 Pa) | Ru (5 Pa) | 14.30 | 3892 | 3.3 | 15.7 | 6.8 | 6.3 |
| Example 1-1-2 | | | Ru—3SiO$_2$ | 14.69 | 3654 | 3.2 | | 5.6 | 5.3 |
| Example 1-1-3 | | | Ru—3Cr$_2$O$_3$ | 14.77 | 3589 | 3.2 | | 5.6 | 5.2 |
| Example 1-1-4 | | | Ru—3TiO$_2$ | 14.52 | 3670 | 3.3 | | 5.5 | 5.2 |
| Example 1-1-5 | | | Ru—6SiO$_2$ | 14.90 | 3442 | 3.3 | | 5.2 | 4.7 |
| Example 1-1-6 | | | Ru—6Cr$_2$O$_3$ | 14.90 | 3407 | 3.4 | | 5.0 | 4.5 |
| Example 1-1-7 | | | Ru—6TiO$_2$ | 15.04 | 3501 | 3.3 | | 5.1 | 4.6 |
| Example 1-2-1 | Ti (hcp) | Ru (0.6 Pa) | Ru (5 Pa) | 14.22 | 3970 | 3.0 | 12.5 | 7.3 | 6.7 |
| Example 1-2-2 | | | Ru—3SiO$_2$ | 14.83 | 3742 | 3.0 | | 6.6 | 6.0 |
| Example 1-2-3 | | | Ru—3Cr$_2$O$_3$ | 14.98 | 3689 | 3.0 | | 6.5 | 5.9 |
| Example 1-2-4 | | | Ru—3TiO$_2$ | 15.02 | 3747 | 2.8 | | 6.5 | 6.0 |
| Example 1-2-5 | | | Ru—6SiO$_2$ | 14.99 | 3528 | 2.9 | | 6.3 | 5.7 |
| Example 1-2-6 | | | Ru—6Cr$_2$O$_3$ | 15.02 | 3506 | 2.9 | | 6.1 | 5.5 |
| Example 1-2-7 | | | Ru—6TiO$_2$ | 15.00 | 3578 | 3.0 | | 6.2 | 5.6 |
| Example 1-3-1 | Al (fcc) | Ru (0.6 Pa) | Ru (5 Pa) | 14.02 | 3692 | 3.6 | 10.9 | 6.8 | 6.1 |
| Example 1-3-2 | | | Ru—3SiO$_2$ | 14.34 | 3405 | 3.6 | | 6.3 | 5.9 |
| Example 1-3-3 | | | Ru—3Cr$_2$O$_3$ | 14.41 | 3542 | 3.7 | | 6.1 | 5.7 |
| Example 1-3-4 | | | Ru—3TiO$_2$ | 14.28 | 3372 | 3.6 | | 6.3 | 5.9 |
| Example 1-3-5 | | | Ru—6SiO$_2$ | 14.77 | 3211 | 3.5 | | 5.7 | 5.3 |
| Example 1-3-6 | | | Ru—6Cr$_2$O$_3$ | 14.84 | 3225 | 3.6 | | 5.5 | 5.1 |
| Example 1-3-7 | | | Ru—6TiO$_2$ | 14.79 | 3399 | 3.6 | | 5.5 | 5.1 |
| Comparative example 1-1 | Mg (hcp) | Ru (0.6 Pa) | Ru (0.6 Pa) | 13.89 | 4106 | 3.2 | 15.5 | 7.4 | 9.8 |
| Comparative example 1-2 | Ti (hcp) | | | 13.55 | 4326 | 2.9 | 12.8 | 7.9 | 10.2 |
| Comparative example 1-3 | Al (fcc) | | | 13.39 | 4055 | 3.5 | 11.0 | 7.5 | 10.4 |

Based on the results of the above measurements, the signal-to-noise ratio (SNR), the coercive force (Hc), the value of Δθ50, the average crystal grain size of the Co of the magnetic recording layer, the average crystal grain size of the Ru of the second intermediate layer, and the average crystal grain size of the seed layer were evaluated for each of the examples and comparative examples. The results are listed in Table 1. Each of these parameters is an indicator frequently used for evaluating the performance of a perpendicular magnetic recording medium.

Figure 4A:
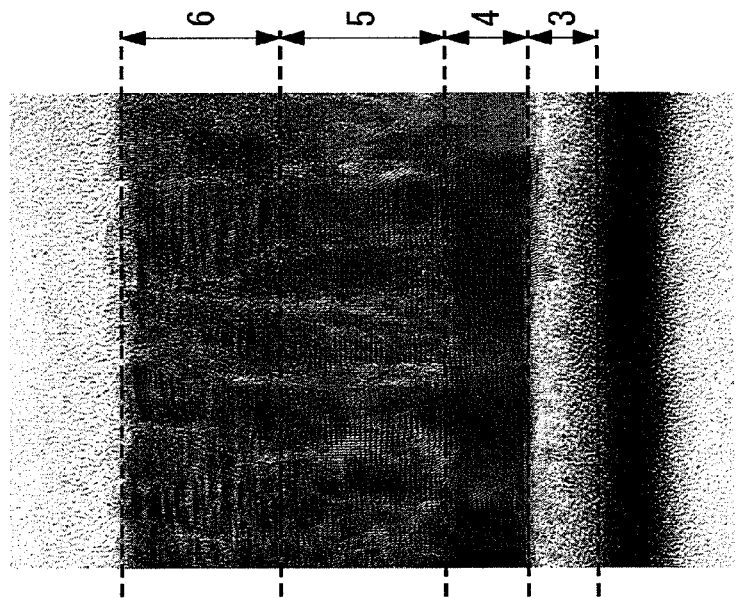
FIG. 4A is a TEM photograph of the cross-section of a perpendicular magnetic recording medium of an example 1-1-1.
Figure 4B:
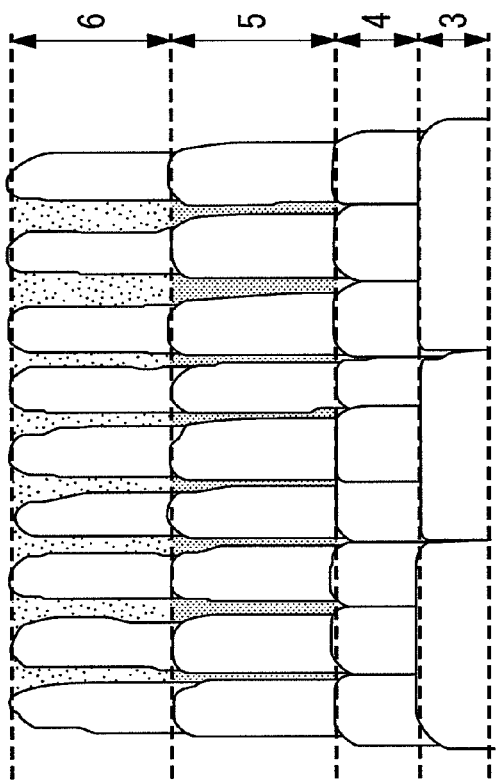
FIG. 4B is a schematic view of the TEM photograph of FIG. 4A.

The results for the examples listed in Table 1 confirmed that for each of the three types of seed layer (Mg, Ti and Al), by setting the gas pressure to 5 (Pa) during deposition of the second intermediate layer compared with a gas pressure of 0.6 (Pa) during deposition of the first intermediate layer, the crystal grain size of the Co of the magnetic recording layer was able to be reduced. FIG. 4A shows a TEM photograph of a cross-section of example 1-1-1, and FIG. 4B is a schematic representation of FIG. 4A.

In contrast, in comparative examples 1-1 to 1-3, where the gas pressure during deposition of the second intermediate layer was 0.6 (Pa), although the Ru crystal grain size within Example 2, Comparative Example 2

Soft magnetic layers were deposited as soft under layers on a plurality of glass substrates in the same manner as example 1. Subsequently, a seed layer of Mg, Mg10Ti, Mg10Al, Mg10Cr, Mg10Ru or Mg10Mn with a thickness of 5 (nm) was deposited on each of the soft under layers under an Ar atmosphere at a gas pressure of 0.6 (Pa) (examples 2-1 to 2-6).

Further in the comparative example, a seed layer of Ni, Ni10Cr, Ni10Mn, Pt, Pt10Cr or Pt10Mn with a thickness of 5 (nm) was deposited on each of the soft under layers under an Ar atmosphere at a gas pressure of 0.6 (Pa) (comparative examples 2-1 to 2-6).

Subsequently, a first intermediate layer of Ru with a thickness of 5 (nm) was deposited on each seed layer under an Ar atmosphere at a gas pressure of 0.6 (Pa), and a second intermediate layer of Ru-10SiO$_2$ with a film thickness of 15 (nm) was then deposited under an Ar atmosphere at a gas pressure of 10 (Pa).

A layer of CoCrPt—SiO$_2$ was then deposited as the magnetic recording layer on each of the second intermediate layers, and then a protective layer composed of a carbon film was deposited on the magnetic recording layer, thus completing production of a series of perpendicular magnetic recording media.

Measurements were performed on the perpendicular magnetic recording media of examples 2-1 to 2-6 and comparative examples 2-1 to 2-6, and the signal-to-noise ratio (SNR), the coercive force (Hc), the value of Δθ50, the average crystal grain size of the Co of the magnetic recording layer, the average crystal grain size of the Ru of the second intermediate layer, and the average crystal grain size of the seed layer were evaluated. The results are listed in Table 2.

From the results for the average grain sizes listed in Table 2 it is clear that when Ni or Pt was used as the seed layer, as in comparative examples 2-1 to 2-6, a single crystal grain of the intermediate layer (Ru) had undergone epitaxial growth on each single crystal grain of the seed layer.

In contrast, when Mg or a Mg alloy was used as the seed layer, as in examples 2-1 to 2-6, it is clear that a plurality of crystal grains of the intermediate layer had undergone epitaxial growth on each single crystal grain of the seed layer.

As a result, although the crystal grain size for the seed layer was smaller for comparative examples 2-1 to 2-6 than for examples 2-1 to 2-6, the crystal grain sizes for the Ru of the second intermediate layer and the Co of the magnetic recording layer were smaller for examples 2-1 to 2-6 than for comparative examples 2-1 to 2-6.

These results confirmed that using a Mg alloy having a hexagonal close-packed structure as the seed layer, as opposed to a material having a face-centered cubic structure such as the Ni or Pt conventionally used as seed layers, reduced the grain size of the Co crystals of the magnetic recording layer, and improved the SNR value.

deposited on each of the soft under layers under an Ar atmosphere at a gas pressure of 0.6 (Pa) (comparative examples 3-1-1 to 3-1-5).

Subsequently, a first intermediate layer of Ru, Pt50Cr, Pt50Re, Cr or V with a thickness of 10 (nm) was deposited on each seed layer under an Ar atmosphere at a gas pressure of 0.6 (Pa), and a second intermediate layer of Ru-12TiO$_2$ with a film thickness of 10 (nm) was then deposited under an Ar atmosphere at a gas pressure of 10 (Pa) (examples 3-1-1 to 3-3-5, and comparative examples 3-1-1 to 3-1-5).

Measurements were performed on the perpendicular magnetic recording media, and the signal-to-noise ratio (SNR), the coercive force (Hc), the value of Δθ50, the average crystal grain size of the Co of the magnetic recording layer, the average crystal grain size of the Ru of the second intermediate layer, and the average crystal grain size of the seed layer were evaluated. The results are listed in Table 3.

The results of Table 3 confirmed that provided the seed layer used Mg, Ti or Al having a hexagonal close-packed structure or a face-centered cubic structure, then even if an alloy material that combines a (111) crystal plane orientation and stacking faults, such as Pt—Cr or Pt—Re, or an element having a body-centered cubic structure such as Cr or V was used as the first intermediate layer, a plurality of crystal grains of the first intermediate layer were epitaxially grown on each single crystal grain of the seed layer, in a similar manner to that observed when Ru having a hexagonal close-packed structure was used as the first intermediate layer.

In contrast, the comparative examples 3-1-1 to 3-1-5 used stacking faults material for both the seed layer and the first intermediate layer, and compared with examples 3-1-1 to 3-3-5, the grain sizes within the intermediate layer and the magnetic recording layer were large and the SNR value was inferior.

In comparative example 3-1-4 and 3-1-5, which used a material having a body-centered cubic structure for the seed layer and the first intermediate layer, because the Ru of the second intermediate layer was deposited on the (110) crystal orientation plane of the body-centered cubic structure of the first intermediate layer, the Ru of the second intermediate layer was oriented in the (101) crystal plane rather than perpendicularly oriented in the (002) crystal plane. As a result, the orientation of the magnetic recording layer formed on top

TABLE 2

| Sample | Seed layer (structure) | First intermediate layer | Second intermediate layer | SNR (dB) | Hc (Oe) | Δθ50 (deg.) | Average grain size of seed layer (nm) | Average grain size of Ru crystals (nm) | Average grain size of Co crystals (nm) |
|---|---|---|---|---|---|---|---|---|---|
| Example 2-1 | Mg (hcp) | Ru (0.6 Pa) | Ru—10SiO$_2$ (10 Pa) | 15.23 | 3267 | 3.2 | 14.6 | 4.6 | 4.3 |
| Example 2-2 | Mg10Ti | | | 15.45 | 3321 | 3.0 | 14.4 | 4.4 | 4.2 |
| Example 2-3 | Mg10Al | | | 15.37 | 3289 | 3.3 | 14.1 | 4.3 | 4.1 |
| Example 2-4 | Mg10Cr | | | 15.32 | 3354 | 3.1 | 14.3 | 4.2 | 4.2 |
| Example 2-5 | Mg10Ru | | | 15.39 | 3426 | 3.3 | 14.5 | 4.9 | 4.4 |
| Example 2-6 | Mg10Mn | | | 15.24 | 3327 | 3.4 | 14.3 | 4.5 | 4.2 |
| Comparative example 2-1 | Ni (fcc) | | | 14.14 | 4652 | 3.0 | 11.5 | 10.8 | 10.5 |
| Comparative example 2-2 | Ni10Cr | | | 13.89 | 4820 | 3.3 | 11.9 | 11.2 | 11.0 |
| Comparative example 2-3 | Ni10Mn | | | 14.11 | 4589 | 3.3 | 11.4 | 10.9 | 10.7 |
| Comparative example 2-4 | Pt (fcc) | | | 14.06 | 4532 | 2.9 | 10.9 | 10.5 | 10.2 |
| Comparative example 2-5 | Pt10Cr | | | 13.85 | 4329 | 3.4 | 10.8 | 10.3 | 10.1 |
| Comparative example 2-6 | Pt10Mn | | | 13.74 | 4278 | 3.6 | 10.7 | 10.3 | 9.9 |

Example 3

Soft magnetic layers were deposited as soft under layers on a plurality of glass substrates in the same manner as example 1. Subsequently, a seed layer of Mg, Ti or Al with a thickness of 5 (nm) was deposited on each of the soft under layers under an Ar atmosphere at a gas pressure of 0.6 (Pa) (examples 3-1 to 3-3).

Further in the comparative example, a seed layer of Ru, Pt50Cr, Pt50Re, Cr or V with a thickness of 5 (nm) was of the second intermediate layer also deteriorated, and no peak was observed in the X-ray diffraction measurement, meaning the value of Δθ50 could not be measured.

The above results confirmed that even with the types of combinations of materials for the seed layer and the first intermediate layer described in examples 3-1-1 to 3-3-5, the crystal grain size could be reduced while maintaining favorable crystal orientation for the magnetic recording layer.

TABLE 3

| Sample | Seed layer (structure) | First intermediate layer (0.6 Pa) | Second intermediate layer (10 Pa) | SNR (dB) | Hc (Oe) | Δθ50 (deg.) | Average grain size of seed layer (nm) | Average grain size of Ru crystals (nm) | Average grain size of Co crystals (nm) |
|---|---|---|---|---|---|---|---|---|---|
| Example 3-1-1 | Mg (hcp) | Ru | Ru—12TiO$_2$ | 14.93 | 3429 | 3.2 | 15.8 | 5.1 | 4.8 |
| Example 3-1-2 | | Pt50Cr | | 14.84 | 3318 | 3.4 | | 4.8 | 4.6 |
| Example 3-1-3 | | Pt50Re | | 14.82 | 3372 | 3.5 | | 4.6 | 4.5 |
| Example 3-1-4 | | Cr | | 14.99 | 3510 | 3.4 | | 4.8 | 4.4 |
| Example 3-1-5 | | V | | 14.92 | 3427 | 3.3 | | 4.7 | 4.5 |
| Example 3-2-1 | Ti (hcp) | Ru | Ru—12TiO$_2$ | 14.88 | 3620 | 2.7 | 12.6 | 6.3 | 6.0 |
| Example 3-2-2 | | Pt50Cr | | 14.92 | 3528 | 2.9 | | 6.0 | 5.7 |
| Example 3-2-3 | | Pt50Re | | 14.90 | 3534 | 2.9 | | 6.0 | 5.7 |
| Example 3-2-4 | | Cr | | 14.96 | 3638 | 2.8 | | 5.8 | 5.5 |
| Example 3-2-5 | | V | | 14.86 | 3696 | 3.0 | | 5.8 | 5.7 |
| Example 3-3-1 | Al (fcc) | Ru | Ru—12TiO$_2$ | 14.65 | 3358 | 3.4 | 10.8 | 5.9 | 5.5 |
| Example 3-3-2 | | Pt50Cr | | 14.71 | 3341 | 3.5 | | 5.3 | 5.0 |
| Example 3-3-3 | | Pt50Re | | 14.59 | 3329 | 3.8 | | 5.6 | 5.2 |
| Example 3-3-4 | | Cr | | 14.61 | 3447 | 3.5 | | 5.5 | 5.3 |
| Example 3-3-5 | | V | | 14.64 | 3441 | 3.7 | | 5.5 | 5.2 |
| Comparative example 3-1-1 | Ru | Ru | Ru—12TiO$_2$ | 13.56 | 4028 | 2.8 | 10.7 | 9.0 | 8.6 |
| Comparative example 3-1-2 | Pt$_{50}$Cr | Pt50Cr | | 13.49 | 4201 | 3.0 | 9.4 | 8.5 | 8.0 |
| Comparative example 3-1-3 | Pt$_{50}$Re | Pt50Re | | 13.50 | 4167 | 3.0 | 9.5 | 8.7 | 8.1 |
| Comparative example 3-1-4 | Cr | Cr | | Not measurable | 2893 | Not measurable | 9.7 | 8.9 | 8.2 |
| Comparative example 3-1-5 | V | V | | Not measurable | 2756 | Not measurable | 10.2 | 9.5 | 8.9 |

INDUSTRIAL APPLICABILITY

By achieving a combination of reduced crystal grain size and increased density for the magnetic crystal grains, while maintaining the perpendicular orientation of the magnetic recording layer, the present invention is able to provide a perpendicular magnetic recording medium that is capable of recording and reproducing information at a high density, as well as a method for producing such a perpendicular magnetic recording medium and a magnetic recording/reproducing device.

The invention claimed is:

1. A perpendicular magnetic recording medium, comprising at least a soft under layer, an orientation control layer, a magnetic recording layer and a protective layer provided on a non-magnetic substrate, wherein
said orientation control layer comprises three or more layers including a seed layer, a first intermediate layer and a second intermediate layer, formed in that order from a side of said substrate,
a plurality of crystal grains that constitute said first intermediate layer are epitaxially grown on each single crystal grain of said seed layer,
each single crystal grain that constitutes said second intermediate layer is epitaxially grown on a single crystal grain of said first intermediate layer,
each single crystal grain that constitutes said magnetic recording layer is epitaxially grown on a single crystal grain of said second intermediate layer, and
crystal grains that constitute said second intermediate layer are finer than crystal grains that constitute said first intermediate layer,
wherein
said first intermediate layer comprises, as a main constituent, at least one element selected from the group consisting of elements having a face-centered cubic structure, is formed from an alloy material of said element of said main constituent and an element selected from the group consisting of elements having a body-centered cubic structure, and
has a structure that combines a crystal structure oriented in a (111) crystal plane, and stacking faults composed of a mixture of a face-centered cubic structure and a body-centered cubic structure.

2. A perpendicular magnetic recording medium, comprising at least a soft under layer, an orientation control layer, a magnetic recording layer and a protective layer provided on a non-magnetic substrate, wherein
said orientation control layer comprises three or more layers including a seed layer, a first intermediate layer and a second intermediate layer, formed in that order from a side of said substrate,
a plurality of crystal grains that constitute said first intermediate layer are epitaxially grown on each single crystal grain of said seed layer,
each single crystal grain that constitutes said second intermediate layer is epitaxially grown on a single crystal grain of said first intermediate layer,
each single crystal grain that constitutes said magnetic recording layer is epitaxially grown on a single crystal grain of said second intermediate layer, and crystal grains that constitute said second intermediate layer are finer than crystal grains that constitute said first intermediate layer, wherein said first intermediate layer comprises, as a main constituent, at least one element selected from the group consisting of elements having a face-centered cubic structure, is formed from an alloy material of said element of said main constituent and an element selected from the group consisting of elements having a hexagonal close-packed structure, and has a structure that combines a crystal structure oriented in a (111) crystal plane, and stacking faults composed of a mixture of a face-centered cubic structure and a hexagonal close-packed structure.

3. A method for producing a perpendicular magnetic recording medium according to claim 1, comprising forming at least a soft under layer, an orientation control layer, a magnetic recording layer and a protective layer on a non-magnetic substrate, wherein said orientation control layer is formed by using a sputtering method to deposit three or more layers including a seed layer, a first intermediate layer and a second intermediate layer, in that order from a side of said substrate, a plurality of crystal grains that constitute said first intermediate layer are epitaxially grown on each single crystal grain of said seed layer, a single crystal grain that constitutes said second intermediate layer is epitaxially grown on each single crystal grain of said first intermediate layer, a single crystal grain that constitutes said magnetic recording layer is epitaxially grown on each single crystal grain of said second intermediate layer, and by increasing a sputtering gas pressure during deposition of said second intermediate layer to a level higher than a sputtering gas pressure used during deposition of said first intermediate layer, crystal grains that constitute said second intermediate layer are reduced in size compared with crystal grains that constitute said first intermediate layer.

4. The method for producing a perpendicular magnetic recording medium according to claim 3, wherein said soft under layer, said seed layer, said first intermediate layer, said second intermediate layer, said magnetic recording layer and said protective layer are laminated, in that order, on said non-magnetic substrate.

5. A method for producing a perpendicular magnetic recording medium according to claim 2, comprising forming at least a soft under layer, an orientation control layer, a magnetic recording layer and a protective layer on a non-magnetic substrate, wherein said orientation control layer is formed by using a sputtering method to deposit three or more layers including a seed layer, a first intermediate layer and a second intermediate layer, in that order from a side of said substrate, a plurality of crystal grains that constitute said first intermediate layer are epitaxially grown on each single crystal grain of said seed layer, a single crystal grain that constitutes said second intermediate layer is epitaxially grown on each single crystal grain of said first intermediate layer, a single crystal grain that constitutes said magnetic recording layer is epitaxially grown on each single crystal grain of said second intermediate layer, and by increasing a sputtering gas pressure during deposition of said second intermediate layer to a level higher than a sputtering gas pressure used during deposition of said first intermediate layer, crystal grains that constitute said second intermediate layer are reduced in size compared with crystal grains that constitute said first intermediate layer.

6. The method for producing a perpendicular magnetic recording medium according to claim 5, wherein said soft under layer, said seed layer, said first intermediate layer, said second intermediate layer, said magnetic recording layer and said protective layer are laminated, in that order, on said non-magnetic substrate.

\* \* \* \* \*